(12) United States Patent
Breger et al.

(10) Patent No.: US 9,542,071 B2
(45) Date of Patent: Jan. 10, 2017

(54) SYSTEM FOR INLINE EXPANSION OF SOCIAL NETWORK CONTENT AND METHOD THEREFOR

(71) Applicant: LinkedIn Corporation, Mountain View, CA (US)

(72) Inventors: David Michael Breger, San Francisco, CA (US); Jesse Venticinque, Mountain View, CA (US); Nash Raghavan, Santa Clara, CA (US)

(73) Assignee: LinkedIn Corporation, Sunnyvale, CA (US)

( * ) Notice: Subject to any disclaimer, the term of this patent is extended or adjusted under 35 U.S.C. 154(b) by 156 days.

(21) Appl. No.: 14/169,995

(22) Filed: Jan. 31, 2014

(65) Prior Publication Data

US 2015/0113443 A1 Apr. 23, 2015

Related U.S. Application Data

(60) Provisional application No. 61/894,190, filed on Oct. 22, 2013.

(51) Int. Cl.
*G06F 3/048* (2013.01)
*G06F 3/0481* (2013.01)
(Continued)

(52) U.S. Cl.
CPC ......... *G06F 3/04817* (2013.01); *G06F 3/0483* (2013.01); *G06F 3/0485* (2013.01); *G06Q 50/00* (2013.01); *G06Q 50/01* (2013.01)

(58) Field of Classification Search
CPC ............. G06F 3/048–3/0488; G06F 17/30126; G06F 17/30867
See application file for complete search history.

(56) References Cited

U.S. PATENT DOCUMENTS 5,867,164 A * 2/1999 Bornstein ............. G06F 17/211
715/236
6,097,391 A 8/2000 Wilcox
(Continued)

OTHER PUBLICATIONS

"U.S. Appl. No. 14/170,163, Notice of Allowance mailed Aug. 21, 2015", 24 pgs.
(Continued)

*Primary Examiner* — Claudia Dragoescu
(74) *Attorney, Agent, or Firm* — Schwegman Lundberg & Woessner, P.A.

(57) ABSTRACT

A device, system, and method may variously include a network interface device communicatively coupled to a user interface and a processor, coupled to the network interface device, configured to cause the user interface to display a newsfeed including social network content items, the newsfeed being configured to scroll to display ones of the social network content items on the user interface. At least one of the content items includes a title and content. The content item is configurable in an expanded state corresponding to displaying all of the content of the content item upon a user selection and a contracted state corresponding to displaying a sub-portion of the content. The newsfeed is configured to display the content items in the contracted state upon the social network content item scrolling onto the user interface without respect to the content item being in an expanded state when previously displayed.

20 Claims, 14 Drawing Sheets

(51) Int. Cl.
*G06F 3/0483* (2013.01)
*G06Q 50/00* (2012.01)
*G06F 3/0485* (2013.01)

(56) References Cited

U.S. PATENT DOCUMENTS

| | | | |
|---|---|---|---|
| 6,262,732 B1 | 7/2001 | Coleman et al. | |
| 7,432,939 B1 | 10/2008 | Platzer et al. | |
| 8,181,119 B1* | 5/2012 | Ording | G06F 9/4443 |
| | | | 715/810 |
| 2003/0115167 A1 | 6/2003 | Sharif et al. | |
| 2003/0142138 A1 | 7/2003 | Brown et al. | |
| 2003/0212688 A1 | 11/2003 | Smith | |
| 2005/0060666 A1 | 3/2005 | Hoshino | |
| 2005/0283742 A1 | 12/2005 | Gusmorino et al. | |
| 2006/0041847 A1 | 2/2006 | Maw | |
| 2006/0236255 A1 | 10/2006 | Lindsay et al. | |
| 2007/0005576 A1* | 1/2007 | Cutrell | G06F 17/30979 |
| 2007/0174791 A1 | 7/2007 | Park et al. | |
| 2008/0307335 A1 | 12/2008 | Chaudhri et al. | |
| 2008/0307364 A1 | 12/2008 | Chaudhri et al. | |
| 2009/0265628 A1 | 10/2009 | Bamford et al. | |
| 2009/0288032 A1 | 11/2009 | Chang et al. | |
| 2012/0278764 A1 | 11/2012 | Arriola et al. | |
| 2013/0021281 A1 | 1/2013 | Tse et al. | |
| 2013/0033438 A1 | 2/2013 | Monteux et al. | |
| 2013/0033499 A1 | 2/2013 | Monteux et al. | |
| 2013/0055078 A1 | 2/2013 | Berger et al. | |
| 2013/0150699 A1 | 6/2013 | Ostermeier et al. | |
| 2014/0137046 A1* | 5/2014 | Matas | G06F 3/04883 |
| | | | 715/838 |
| 2014/0380247 A1 | 12/2014 | Tecarro et al. | |
| 2015/0113444 A1 | 4/2015 | Breger et al. | |
| 2015/0113445 A1 | 4/2015 | Breger et al. | |
| 2015/0113482 A1 | 4/2015 | Breger et al. | |

OTHER PUBLICATIONS

"U.S. Appl. No. 14/170,119, Non Final Office Action mailed Nov. 6, 2015", 12 pgs.

"U.S. Appl. No. 14/170,163, Notice of Allowance mailed Dec. 10, 2015", 5 pgs.

"U.S. Appl. No. 14/170,247, Non Final Office Action mailed Oct. 7, 2015", 19 pgs.

Resig, John, "Pro JavaScript Techniques. Apress", Building an Image Gallery, (2006), 191-211.

"U.S. Appl. No. 14/170,119, Final Office Action mailed Mar. 30, 2016", 13 pgs.

"U.S. Appl. No. 14/170,119, Response filed Mar. 7, 2016 to Non Final Office Action mailed Nov. 6, 2015", 10 pgs.

"U.S. Appl. No. 14/170,163, Notice of Allowance mailed May 10, 2016", 5 pgs.

"U.S. Appl. No. 14/170,247, Final Office Action mailed Jul. 14, 2016", 20 pgs.

"U.S. Appl. No. 14/170,247, Response filed Mar. 7, 2016 to Non Final Office Action mailed Oct. 7, 2015", 9 pgs.

Kwon, Oh Seok, et al., "Flexible FET-Type VEGF Aptasensor Based on Nitrogen-Doped Graphene Converted from Conducting Polymer", ACS Nano, vol. 6, No. 2, (2012), 1486-1493.

Song, Shiping, et al., "Aptamer-based biosensors", Trends in Analytical Chemistry, vol. 27, No. 2, (2008), 108-117.

Yoo, Eun-Hyung, et al., "Glucose Biosensors: An Overview of Use in Clinical Practice", Sensors 10, (2010), 4558-4576.

* cited by examiner

SYSTEM FOR INLINE EXPANSION OF SOCIAL NETWORK CONTENT AND METHOD THEREFOR

RELATED APPLICATIONS

This application claims the benefit of priority to U.S. Provisional Application No. 61/894,190, filed Oct. 22, 2013, which is incorporated by reference herein in its entirety.

TECHNICAL FIELD

The subject matter disclosed herein generally relates to presentation and inline expansion of social network content.

BACKGROUND

Contemporary social networks display content relating to a variety of content categories. Member profiles, user messages and comments, information from groups and companies, advertisements, and the like can combine to create the overall content that constitutes at least some of the content that can be displayed on a web page or application ("app") to users of the social network. Such information has been organized in a generally linear scrolling display conventionally known as a "newsfeed," "feed," or "stream." Newsfeeds have been organized according to the order in which information is received, relevance, and other criteria.

BRIEF DESCRIPTION OF THE DRAWINGS

Some embodiments are illustrated by way of example and not limitation in the figures of the accompanying drawings.

DETAILED DESCRIPTION

Figure 1:
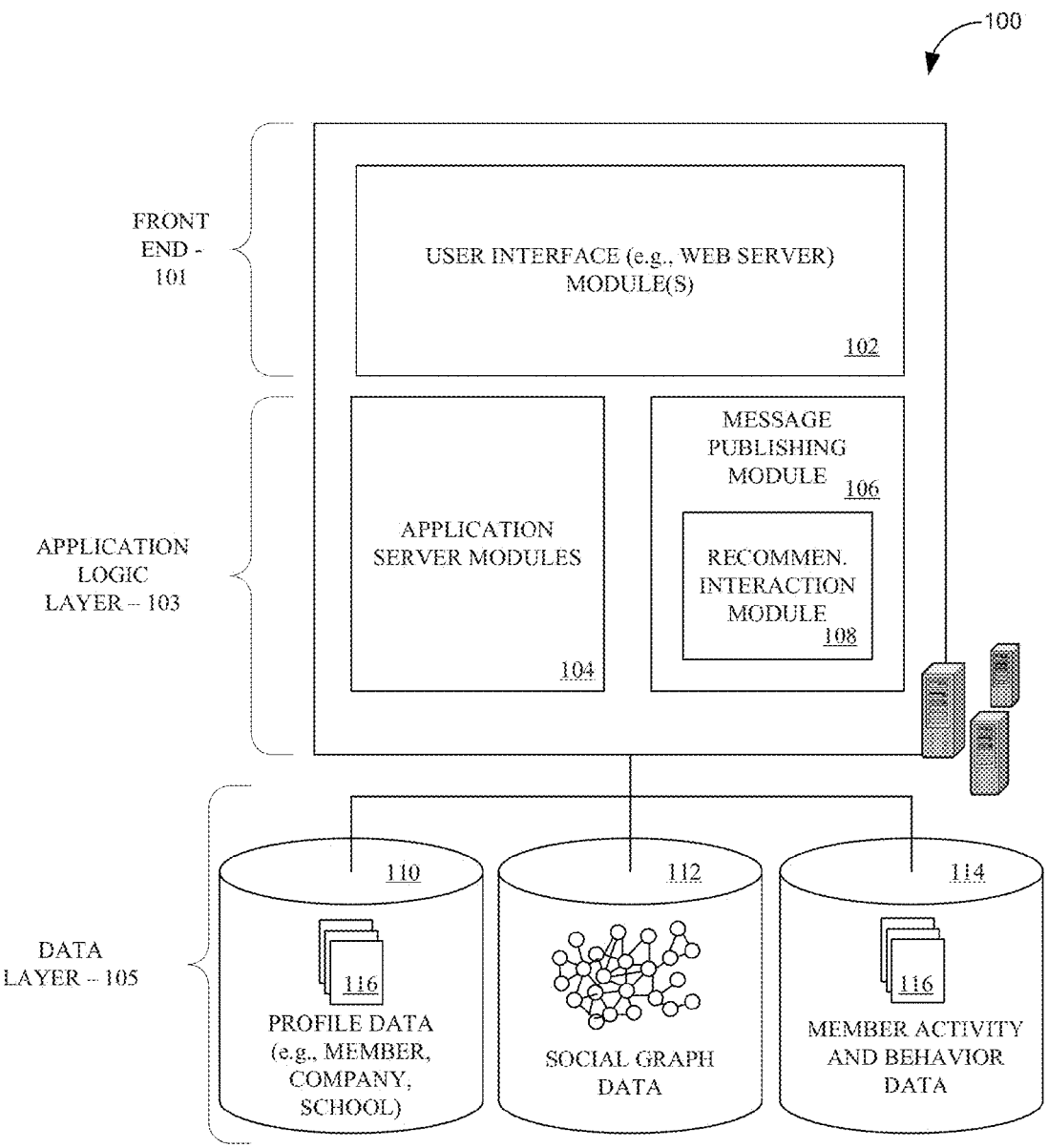
FIG. 1 is a block diagram illustrating various components or functional modules of a social network, in an example embodiment.

Example methods and systems are directed to presentation and inline expansion of social network content. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

As the sources of social network information expand, the way in which such information is presented to users of the social network may become more challenging. A user of the social network has the potential to be exposed to so much information that the utility of the information and/or the user experience in general may be reduced. A conventional newsfeed, for instance, may become so long and filled with so much information that a user may have difficulty finding desired information or may be overwhelmed by the amount of information presented.

The inline expansion of online content is known. Multiple pieces of content may be displayed in series on, for instance, a webpage, but with each piece in a contracted state, such as a first, predefined portion of each piece of content. Thus, a news website may display a title and a few sentences of each news article on the site while also providing a link or other interaction capability that would cause the content to expand in line to show a larger portion of the content, such as all of the content. The content may, in various examples, be contracted based on a user selection or upon leaving or reloading the webpage.

However, such inline expansion and contraction systems may tend to clutter the webpage with expanded content that the user has viewed but no longer needs and has not contracted. As a result, the webpage may become cluttered and overly long, potentially reducing the utility and user experience of the webpage. At minimum, where contracting content relies on user interaction, such user interaction necessarily draws on user attention and potentially reduces the user experience.

It has been discovered that the display of content, such as in a social network application and/or webpage, may be managed through the inline expansion and automatic contraction of content. In an example, a user may cause the inline expansion of content, such as in a newsfeed. While the content remains displayed on the user interface the content remains in the expanded configuration. However, once the user, e.g., scrolls the newsfeed so that the content as expanded is no longer visible to the user the user interface may cause the content to be displayed in the contracted configuration the next time the content is displayed to the user. As such, a newsfeed may tend to remain in a relatively more ordered and aesthetically pleasing state even while being actively used by a user.

FIG. 1 is a block diagram illustrating various components or functional modules of a social network 100, consistent with some examples. A front end 101 consists of a user interface module (e.g., a web server) 102, which receives requests from various client-computing devices, and communicates appropriate responses to the requesting client devices. For example, the user interface module(s) 102 may receive requests in the form of Hypertext Transport Protocol (HTTP) requests, or other web-based, application programming interface (API) requests. An application logic layer 103 includes various application server modules 104, which, in conjunction with the user interface module(s) 102, may generates various user interfaces (e.g., web pages, applications, etc.) with data retrieved from various data sources in a data layer 105. In some examples, individual application server modules 104 may be used to implement the functionality associated with various services and features of the social network service. For instance, the ability of an organization to establish a presence in the social graph of the social network 100, including the ability to establish a customized web page on behalf of an organization, and to publish messages or status updates on behalf of an organization, may be services implemented in independent application server modules 104. Similarly, a variety of other applications or services that are made available to members of the social network service may be embodied in their own application server modules 104. Alternatively, various applications may be embodied in a single application server module 104.

In some examples, the social network 100 includes a message publishing module 106, such as may be utilized to receive content, such as messages, posts, links, images, videos, and the like, and publish the content to the social network. The message publishing module 106, or the social network 100 generally, may include a recommended interaction module 108. As will be disclosed in detail herein, the recommended interaction module 108 may generate and present, such as via the message publishing module 106, recommended interactions for particular members of the social network 100 based on a relevance of various events, such as are stored in the data layer 105 or obtained via the application server module 104, the message publishing module 106, and/or the social network 100 generally.

As illustrated, the data layer 105 includes, but is not necessarily limited to, several databases 110, 112, 114, such as a database 110 for storing profile data, including both member profile data as well as profile data for various organizations. Consistent with some examples, when a person initially registers to become a member of the social network service, the person may be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the database 110. Similarly, when a representative of an organization initially registers the organization with the social network service, the representative may be prompted to provide certain information about the organization. This information may be stored, for example, in the database 110, or another database (not shown). With some examples, the profile data may be processed (e.g., in the background or offline) to generate various derived profile data. For example, if a member has provided information about various job titles the member has held with the same or different member profile attribute indicating the member's overall seniority level, or seniority level within a particular company. With some examples, importing or otherwise accessing data from one or more externally hosted data sources may enhance profile data for both members and organizations. For instance, with companies in particular, financial data may be imported from one or more external data sources, and made part of a company's profile.

Once registered, a member may invite other members, or be invited by other members, to connect via the social network service. A "connection" may require a bi-lateral agreement by the members, such that both members acknowledge the establishment of the connection. Similarly, with some examples, a member may elect to "follow" another member. In contrast to establishing a connection, the concept of "following" another member typically is a unilateral operation, and at least with some examples, does not require acknowledgement or approval by the member that is being followed. When one member follows another, the member who is following may receive status updates or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed or content stream. In any case, the various associations and relationships that the members establish with other members, or with other entities and objects, are stored and maintained within the social graph database 112.

The social network service may provide a broad range of other applications and services that allow members the opportunity to share and receive information, often customized to the interests of the member. For example, with some examples, the social network service may include a photo sharing application that allows members to upload and share photos with other members. With some examples, members may be able to self-organize into groups, or interest groups, organized around a subject matter or topic of interest. With some examples, the social network service may host various job listings providing details of job openings with various organizations.

As members interact with the various applications, services and content made available via the social network service, the members' behavior (e.g., content viewed, links selected, etc.) may be monitored and information concerning the member's behavior may be stored, for example, as indicated in FIG. 1 by the database 114. This information may be used to classify the member as being in various categories. For example, if the member performs frequent searches of job listings, thereby exhibiting behavior indicating that the member is a likely job seeker, this information can be used to classify the member as a job seeker. This classification can then be used as a member profile attribute for purposes of enabling others to target the member for receiving messages or status updates. Accordingly, a company that has available job openings can publish a message that is specifically directed to certain members of the social network service who are job seekers, and thus, more likely to be receptive to recruiting efforts.

The profile data database 110 and the member activity database 114 may, among other sources in the social network 100, include or store events 116. Such events include but are not necessarily limited to birthdays, anniversaries, change of status (employment, location, etc.), a publication, and a previous interaction. Such events may be stored automatically and/or may be stored on the basis of a user selection or choice.

Although not shown, with some examples, the social network 100 provides an application programming interface (API) module via which third-party applications can access various services and data provided by the social network service. For example, using an API, a third-party application may provide a user interface and logic that enables an authorized representative of an organization to publish messages from a third-party application to various content streams maintained by the social network service. Such third-party applications may be browser-based applications, or may be operating system-specific. In particular, some third-party applications may reside and execute on one or more mobile devices (e.g., phone, or tablet computing devices) having a mobile operating system.

User Interface

Figure 2:
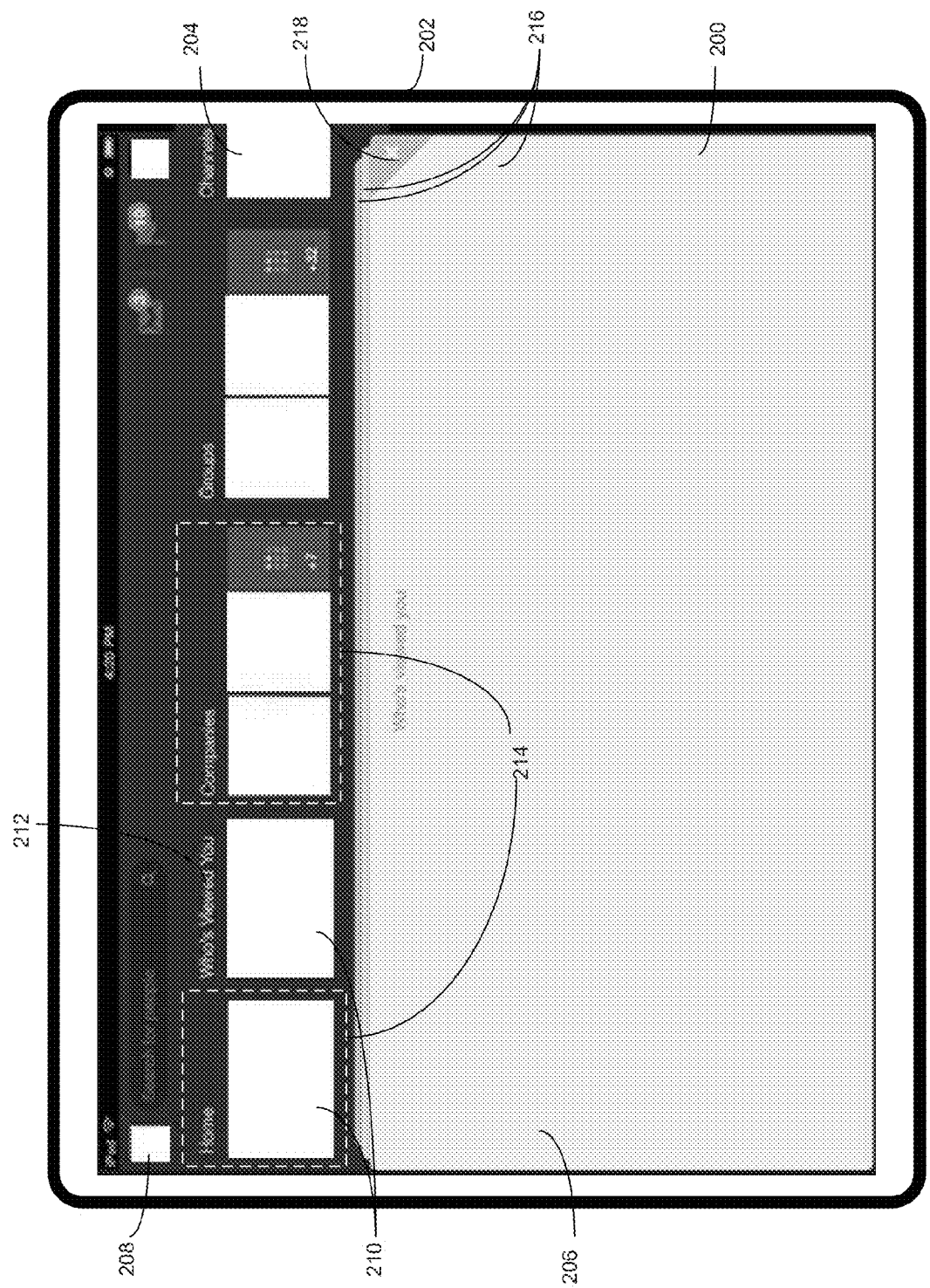
FIG. 2 is an example user interface for displaying social media content on a client device, in an example embodiment.

FIG. 2 is an example user interface 200 for displaying social media content on a client device 202. It is to be recognized that the user interface 200 may incorporate any of a variety of additional information, related to social network activity or otherwise, not explicitly shown here.

The client device 202 may be any of a variety of computing or communication devices, such as personal computers, tablet computers, notebooks, netbooks, smartphones, personal digital assistants (PDAs), personal media players, or any device configured to display a webpage, network-connected application, or other information-displaying mechanism. The client device 202 may be one of a variety of client devices 202 that may be connected to the system 100 via a communication network, as disclosed herein. The user interface 200 may correspond to a particular user of the social network and may not necessarily consistently correspond to a particular client device 202 but rather may be accessed from any of a variety of client devices 202 communicatively coupled to the system 100.

The user interface 200 is a user interface such as may be generated by the user interface module 102. As illustrated, the example user interface includes content selection display area or ribbon 204 and a content display area 206 as well as a menu bar 208. The ribbon 204 and, in certain instances, the menu bar 208, may allow for the selection of content for displaying in the content display area 206. In various examples of the user interface 200, some or all of the content selection display area 204, the content display area 206, and the menu bar may be included or not included, and various examples of the various areas 204, 206, 208 may be included or mixed and matched. For instance, as will be disclosed herein, a ribbon 204 may be combined with a conventional content display area 206 that does not include multiple pages, or a content display area 206 may be utilized with only a menu bar 208 and not with a content selection display area 204. Any combination of all or some of the components 204, 206, 208 is contemplated.

The menu bar 208 may provide for the selection of generally system-level social network commands and interactions. Thus, in contrast to the function of the ribbon 204 as disclosed herein, the menu bar 208 may provide for the selection not of social network content but rather notifications, searching, and general information. The menu bar 208 may display information and/or results in a variety of ways, including as drop-down displays, separate windows, and/or as pages in the content display area 206 as disclosed herein. Additionally or alternatively, in various examples in which the ribbon 204 is hidden, the ribbon 204 may be selected and displayed from the menu bar 208.

Ribbon

The ribbon 204 includes icons 210 corresponding to social network content that may, upon selection of the icon 210, cause the display of the content corresponding to the icon 210. In an example, the selection of an icon 210 causes the display of a page in the content display area 206 as disclosed herein. In various alternative examples, the selection of an icon 210 may cause the display of other icons 210, such as in the ribbon or elsewhere in the user interface 200.

In an example, various icons 210A correspond to individual pages that may be displayed in the content display area 206. Other icons 210B correspond to categories of social network content. As illustrated, icons 210 are organized according to categories 212. However, certain categories have more than a predetermined number of icons 210A; as illustrated, the predetermined number is two (2), but it is to be recognized that the predetermined maximum number of icons 210A per category may be selected to any desirable number. Categories with more than two (2) icons 210A may thus have a category icon 210B that causes the display of additional icons 210A of the category 212. In an example, the selection of the category icon 210B causes the display of all of the icons 210A of the category 212. The display of the additional icons 210A upon the selection of the category icon 210B may be in the ribbon 204 or may be elsewhere in the user interface 200, such as a page in the content display area 206.

The ribbon 204 may be configured to scroll if the total number of icons 210 to be displayed exceeds the space allotted for the ribbon 204. The scrolling of the ribbon 204 may be conducted according to any of a number of scrolling techniques known in the art. For instance, where the client device 202 includes a touchscreen, a user may swipe the ribbon 204 in one direction or the other. Where the client device 202 includes a mouse the mouse may be used with a cursor to drag the ribbon 204 or a scroll wheel may similarly be utilized.

In an example, the ribbon 204 includes a particular icon 210 and/or category 212 as the first icon 210 or category 212 in the ribbon 204. In such an example, the origin of the ribbon 204 places the first icon 210 in the left-most position of the ribbon 204 as illustrated and the ribbon 204 cannot be scrolled further to the left. Relatedly, another icon 210 may be in the last, right-most position of the ribbon 204 and the ribbon 204 cannot be scrolled past the right-most position. In a different example, the ribbon 204 may loop and cycle through the icons 210 in series, with the first icon 210 being adjacent to the last icon 210 in the loop.

While the ribbon 204 is illustrated as being horizontal, toward the top of the user interface, and left-to-right in the user interface 200, it is to be recognized that the ribbon 204 may be positioned in any of a variety of orientations and locations in the user interface 200. In an example, the ribbon 204 is a vertical orientation from top-to-bottom. In various examples, the ribbon 204 is above the menu bar 208 on the user interface 200.

The categories 212 may be selected in the first instance and then organized into positions 214 according to various factors. In an example, categories 212 are organized according to one or more of: past accessing of icons 210 of the category 212, a likelihood in the future of the user accessing icons 210 of the category 212, a user selection or user preference for the ordering of the categories 212, and social network administrator ordering of the categories 212. Thus, a user may initially be presented with categories 212 that are generally popular within the social network and given the option to make a user selection of those and other categories as disclosed herein. Certain factors may override other factors.

In the illustrated example, the "home" category may be placed in a first position 214A based on a social network administrator ordering that overrides other factors. Thus, the "home" category may always be accessible to a user. It is to be understood that the social network administrator may recognizing multiple categories 212 as being in relatively early positions 214 in the ribbon 204 and may thus order such categories 212 accordingly.

Additional categories 212 may be organized in later positions 214B according to a default based on pas accessing and/or future likelihood of the user of the user interface 202 to access icons 210 of the respective categories. It is recognized that past selection of icons 210 may be indicative of future likelihood to access such icons 210 and that such factors may, to an extent, be redundant. However, interactions by other members of the social network may provide data that indicates that a given user of the user interface 200 may have an increased future likelihood of selecting an icon 210 from a category 212 even though the user has not had a high past selection rate of such icons 210. For instance, the system 100 may note that accessing icons 210 from a certain category 212 is increasing within the social network as a whole and may thus place the category 212 in a higher position 214 within the ribbon 204.

In an example, a first category 212 that has had more previous selections by the user over a given time period than a second category is placed in a earlier position 214B while a second category 212 that has fewer previous selections is placed in a later position 214C. The given time period may be selected or modified to increase or decrease a sensitivity to the user's most recent uses of the social network. Thus, the time period may be selected ranging from days, weeks, or months.

A number of times the user has selected icons 210 from a category 212 may be weighted according to other factors or user selection considerations. For instance, previous selections may be based on a regularity with which those selections occur. For instance, if a user consistently selects an icon 210 from a category 212 every time or most times the user accesses the social network then the category 212 may be placed in an earlier position 212B than a category 212 that has been accessed approximately the same number of times but inconsistently and not necessarily every time or most times the user accesses the social network. In an example, the weight of a category 212 may be reduced by the percentage of time the category 212 is accessed during a session with the social network; thus, if a category is accessed in only forty (40) percent of sessions then the significance of previous accessing of the category 212 may be reduced by sixty (60) percent.

Previous selections of icons 210 of a category 212 may further be weighted by accessing categories 212 and icons 210 by other users of the social network. Thus, if a category 212 is increasing in access generally throughout the social network then the category 212 may be placed in an earlier position 214B in the ribbon 204. In an example, the weight of a category 212 may be adjusted by a percentage increase or decrease of the accessing of the category 212 in the social network generally over a period of time. Thus, if usage of a category 212 in the social network generally is up twenty-five (25) percent over a two (2) week period then the category 212 may be weighted twenty-five (25) percent higher in positioning the category 212 in the ribbon 204.

In various examples, user ordering of categories 212 may be treated as a weighting of the position of the category 212. Thus, for instance, the weight of a category 212 may be doubled if the user selects the category 212 as being of particular interest to the user. Alternatively, user ordering of a category 212 may be dispositive over some or all of the other factors. Thus, if the user positions a category 212 in a particular position 214B the user interface 200 or the system 100 generally may not override that positioning. In various examples, user ordering does not override all other factors. In an example, the social network administrator ordering may not be overridden by the user.

Thus, in such an example, the user may order categories as the user desires except for changing the position of the "home" category. In such an example, categories 212 that are not deliberately ordered by the administrator and/or the user may then be subject to previous selection and likelihood to select. In various examples, user ordering may be overridden in the event the user has not accessed the category 212 for a selected period of time. For instance, if the user has not accessed a category in three (3) months the category may be treated as no longer being subject to user ordering.

The icons 210 can be organized within the categories 210 according to some or all of the factors described with respect to the categories 212. Thus, icons 210 may be ordered within categories 212 based on user selection, previous use, and so forth. In various examples, as noted above, the predetermined number of icons 210 that are highest-rated according to the factors described herein are displayed in the ribbon 204 while the other icons 210 of a category 212 are displayed only on selection of the category icon 212B, as disclosed in further detail herein.

Pages

The content display area 206, as illustrated, includes multiple pages 216A, 216B, 216C (collectively "pages 216"). In an example, each page 216 is opened upon the selection of a corresponding icon 210 in the ribbon 204 and/or a selection from the menu bar 208. As noted above, the ribbon 204 may be applicable without a content display area 206 that may provide multiple pages 216 and the content display area 206 with multiple pages 216 may be utilized without the ribbon 204. While the ribbon 204 and the pages 216 will be discussed herein with respect to one another, it is to be understood that the principles described herein are applicable to other selection of social media content without respect to the ribbon 204.

As illustrated, the pages 216 are layered and superimposed in a graphical stack as their corresponding icons 210 are selected. Thus, a page 216C that was selected first in time among the pages 216 displayed generally is on the bottom of the stack while the pages 216A, 216B that were selected after the selection of the page 216C are displayed on top of the page 216, with the most recently selected page 216A on the top of the stack. If another icon 210 were selected following the display of the page 216A then a page 216 corresponding to the icon 210 would be displayed over the page 216A.

Pages 216 which are not on the top of the stack are visible in part though their content is obscured in whole or in part. As illustrated, the pages 216 are fully opaque with respect to one another and the content of the lower pages 216B, 216C is fully or substantially obscured by the pages above them. In various examples, the pages 216 may be at least partially transparent or otherwise offset with respect to one another and allow the content of lower pages 216B, 216C to be visible.

As illustrated, the top page 216A includes a page closing icon 218. When selected by the user the top page 216A is removed or otherwise deleted and the page 216B becomes the top page. In various examples, the selection of a lower page 216B, 216C, such as by touching or clicking on a visible portion of the page 216B, 216C, may bring the selected page 216 to the top, either by closing or otherwise deleting the pages 216 above the selected page or by placing the selected page 216 on the top of the stack and ahead of the unselected pages 216.

In various examples, the selection of an icon 210 that corresponds to content that is already included in a page 216, e.g., page 216B, may have various effects. In one example, the selection of the icon 210 creates a new instance of the same content in a new page 216 that is placed over the page 216A. Alternatively, the selection of the icon 210 may bring the page 216B to the top of the stack by placing the page 216B above the page 216A, i.e., by placing the page 216B above every other page 216 on the stack. Alternatively, the selection of the icon 210 may bring the page 216B to the top of the stack by deleting the page 216A, i.e., by deleting any page above the page 216 corresponding to the icon.

In various examples, certain icons 210 may result in different effects on the display of pages 216. For instance, the selection of the "home" icon 210 may delete all other pages 216, resulting in the display only of the page 216 corresponding to "home" while the selection of other icons 210 places the corresponding page on the top of the stack. It is to be recognized that the "home" icon 210 may function the same as other icons 210, or the other icons 210 may have unique functions on selection.

Figure 3:
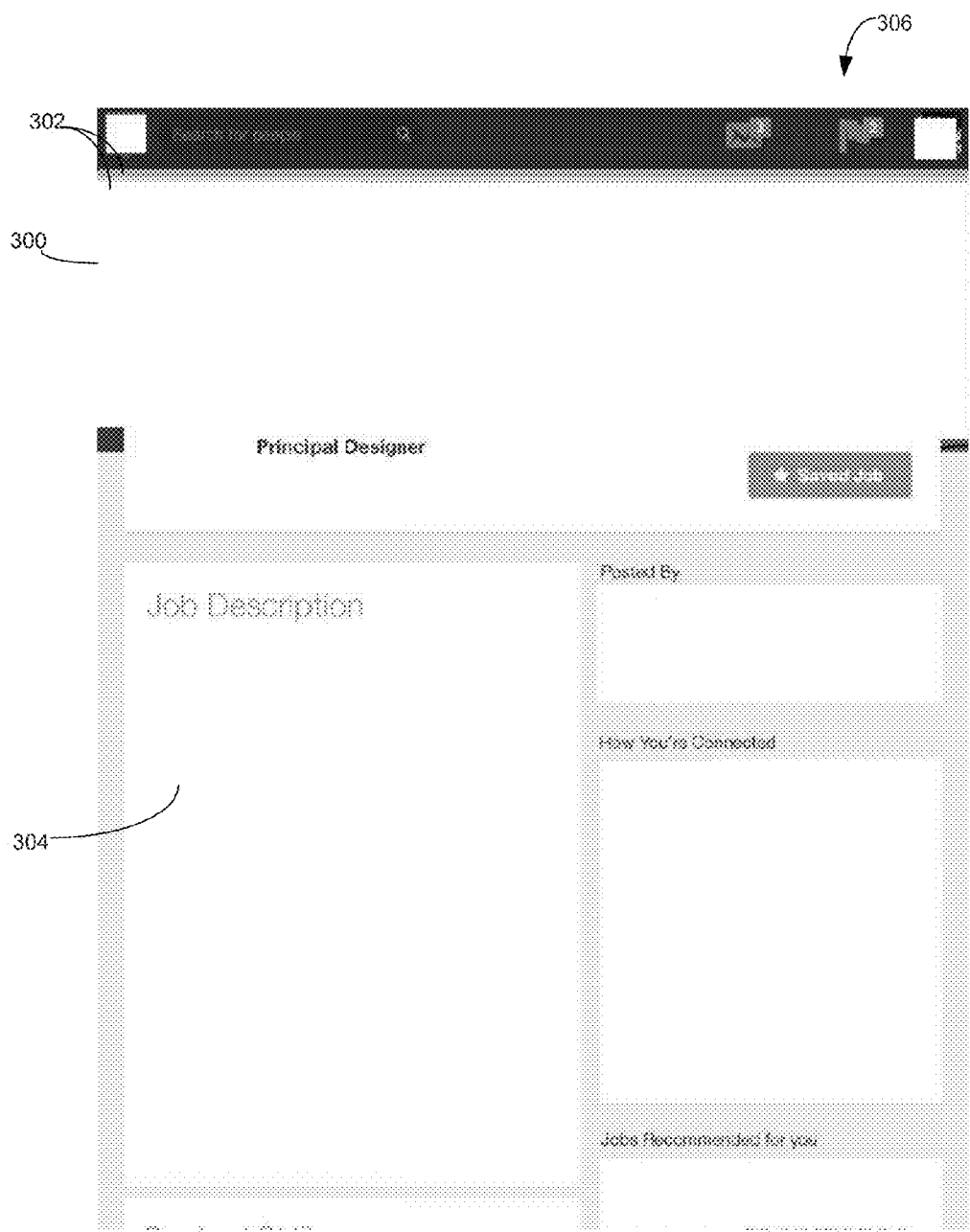
FIG. 3 is an example of a content display area in which the size of the content display area may vary, in an example embodiment.

FIG. 3 illustrates an example of a content display area 300 in which the size of the content display area may vary. For instance, the content display area 300 may be expanded during normal use to obscure a ribbon 204 and/or the menu bar 208. Thus, when the user is viewing pages 302 and not seeking to select new icons 210, such as to display new pages 302, the content display area 300 may occupy all or substantially all of the visual space 304 of a user interface 306. However, when the user wishes to select a new icon 210 the user may bring up the ribbon 204 and cause the content display area 300 to contract back to a space as illustrated in FIG. 2.

As illustrated, the while the ribbon 204 is obscured, the content display area 300 does not cover the menu bar 208. In various alternative examples, the content display area 300 may expand to cover or otherwise obscure the menu bar 208 in whole or in part. Further, while the content display area 300 is shown as covering the entire ribbon 204, in various examples the ribbon 204 is covered or obscured only in part by the content display area 300.

The content display area 300 illustrates an alternative arrangement for the pages 302 in contrast to the pages 216 of the content display area 206. As illustrated in FIG. 2, the pages 216 are shown receding into the background the farther down the stack they go; thus, the page 216C appears smaller than the pages 216A and 216B. As illustrated in FIG. 3, the pages 302 are of the same size regardless of which is on top of the stack of pages 302.

Additionally, the pages 302 as illustrated do not include a visible closing icon, such as the closing icon 218 of the pages 216. Thus, the pages 302 may be deleted or removed from the user interface 306 by selecting an icon 210 that may delete pages 302 on the user interface 306, such as the "home" icon above. Additionally or alternatively, the pages 302 may include a closing icon that is normally concealed but which may be made visible through a user interaction, such as by hovering a cursor over a region that corresponds to the closing icon or by tapping a portion of the page 302 that corresponds to a concealed closing icon. However, it is to be understood that the pages 302 may optionally include a visual closing icon in various examples. Additionally or alternatively, pages 302 may be removed without interacting with a closing icon 218, such as through a physical gesture, such as a swipe.

Icon Selection

Figure 4:
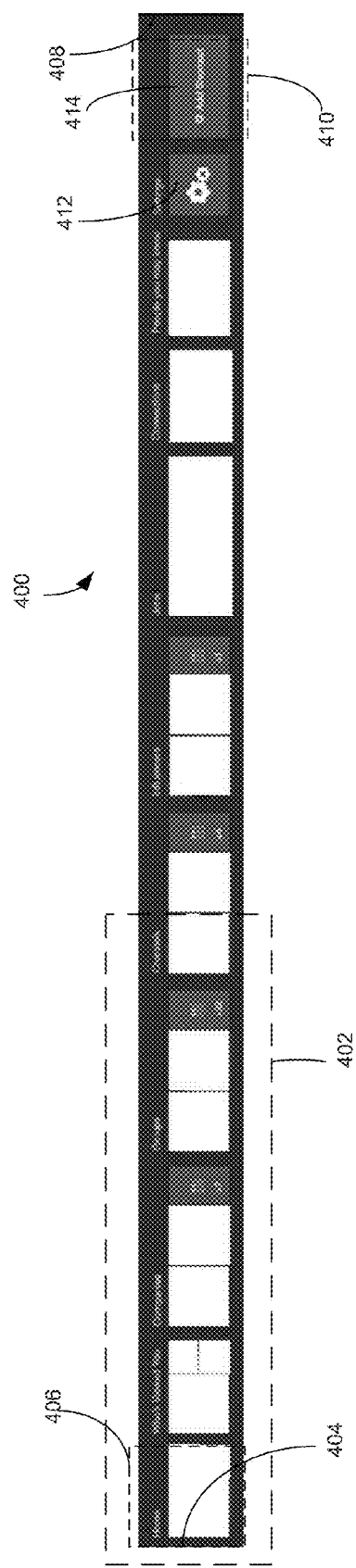
FIG. 4 is a complete depiction of a ribbon, in an example embodiment.

FIG. 4 is a depiction of a complete depiction 400 of the ribbon 204 as shown in FIG. 2. The visible region 402 depicts approximately what is visible in FIG. 2. By scrolling the ribbon 204 the visible region 402 slides left or right along the ribbon 204 to represent what is viewable on the user interface 200. As noted above, the left-most end 404 may be a highest-priority position 406 in the ribbon 204 while the right-most end 408 may be a lowest-priority position 410 based on the factors described herein. Other categories 212 may be positioned along the ribbon 204 in descending priority from left to right according to the factors described herein.

As illustrated, the lowest priority categories 212 are for settings 412 and adding an icon 414. Such categories 412, 414 may be set to the lowest priority based on administrative ordering, as disclosed above. Thus, it is noted that, in the illustrated example, administrative ordering places categories in both the highest- and lowest-priority positions 406, 410. However, in various examples, the administrative ordering does not necessarily place categories in both or either of the high and low priority positions 406, 410.

Because the ribbon 400 may operate without respect to, for instance, a client display area 206, the selection of an icon 210 in the ribbon 400 does not necessarily inherently result in the display of associated content in a page. For instance, the selection of an icon 210 may cause the related content to be displayed in a dropdown menu, a popup window, or other location. Further, while in examples where the ribbon 400 is incorporated with the content display area 206 the selection of an icon 210 results or may result in the presentation of the content in the content display area 206, it is noted that in examples where settings and adding an icon are included in the menu bar 208 the associated function may appear as a dropdown menu or in another presentation.

Figure 5:
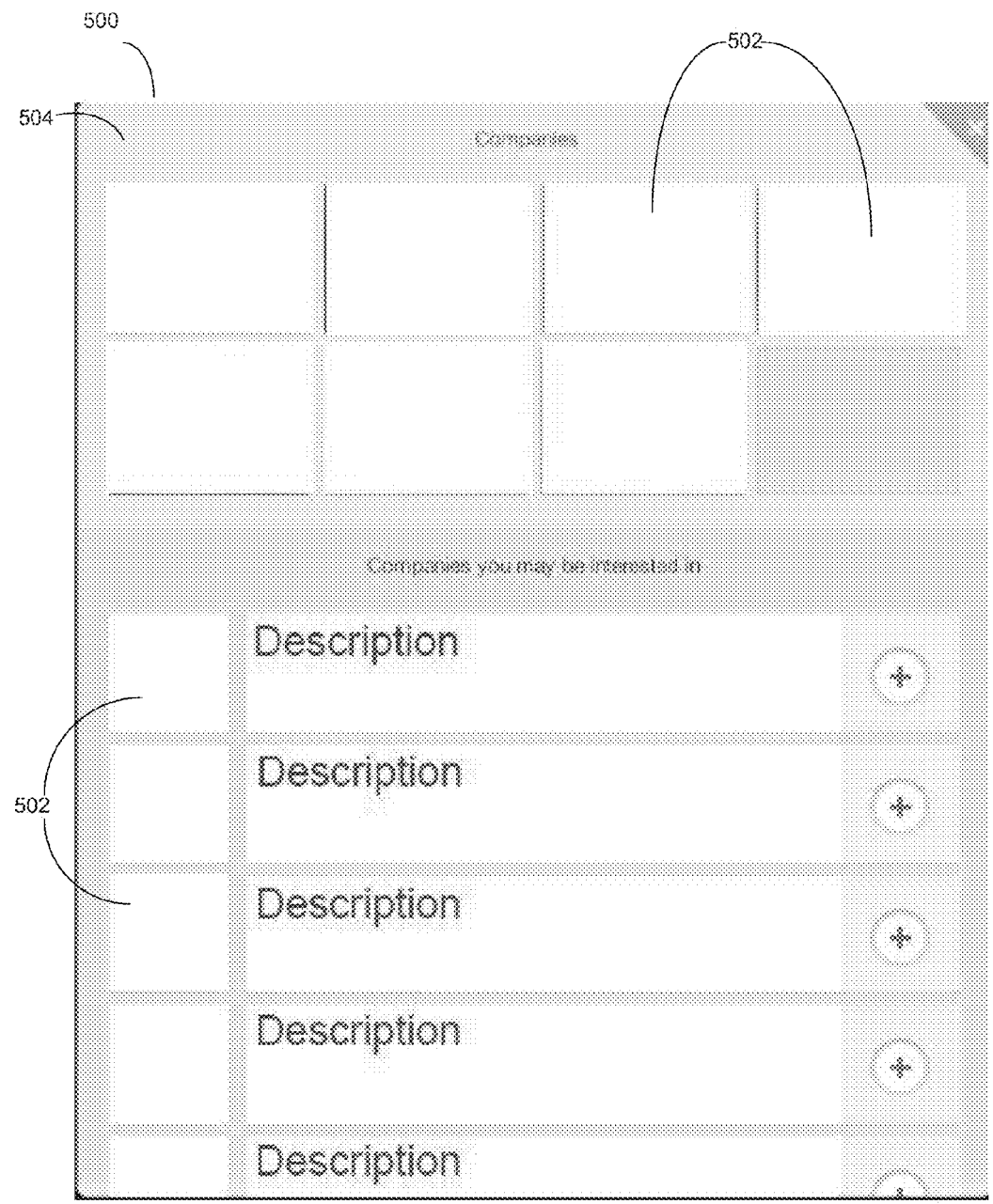
FIG. 5 is a depiction of a page displaying an icon selection function that may be performed by a user, in an example embodiment.

FIG. 5 is a depiction of a page 500 displaying an icon selection function that may be performed by a user, as described above. In an example, the icon selection page 500 is displayed in the content display area 206 upon the selection of a corresponding icon 210 from the ribbon 400. In examples where the content display area 206 is not associated with a ribbon 204, 400 or the selection of icons may result in the display of icons in places other than the ribbon 204, 400, the icon selection page 500 may be displayed based on a selection from the menu bar 208 or other selection source.

The page 500 includes multiple icons 502 that correspond to content that may be displayed in the content display area 206, such as in individual pages 302. The icons 502 may be all icons that may be available. However, all of the icons that may be available may be too many to be practical to be displayed, and as such the icons 502 may be a subset of a complete universe of icons. In various examples, the subset of icons 502 may be based on search criteria entered by a user, may be based on particular categories with which the icons 502 may be displayed in the ribbon 204, may be based on recommended content from the system 100, may be based on content that has been promoted by a sponsoring entity, may be based on an advertisement, and so forth. In an example, when the user selects the icon 414 for adding an icon a list of categories is displayed to the user with which the user may select a category. Icons 502 corresponding to that category may be displayed on the page 500. The icons 502 may further be searched or subject to some or all of the limiting criteria described above.

The icons 502 may be organized according to some or all of the criteria listed above. Thus, recommended or sponsored content may be positioned closer to a top 504 of the page 500 than unsponsored or non-recommended icons 502. Icons 502 that correspond most closely to search criteria may be posited closer to the top 504 of the page than icons 502 that do not meet search criteria or do not meet search criteria as closely.

Selection of an icon 502 may be conducted according to any of a variety of modes. If a user selects the icon 502 by touching, clicking, or otherwise directly interacting with the icon 502, the icon 502 may be selected and placed in the ribbon 204 according to the criteria disclosed herein. A user may be prompted for confirmation that the icon 204 is to be added to the ribbon 204. Alternatively, an icon 502 may be selected by, for instance, dragging the icon 502 to the ribbon 204. In such an example, the dragging act may place the icon 502 in a particular location in the ribbon 204 based on a location in the ribbon 204 to which the user drags the icon 502.

Inline Expansion

Figure 6:
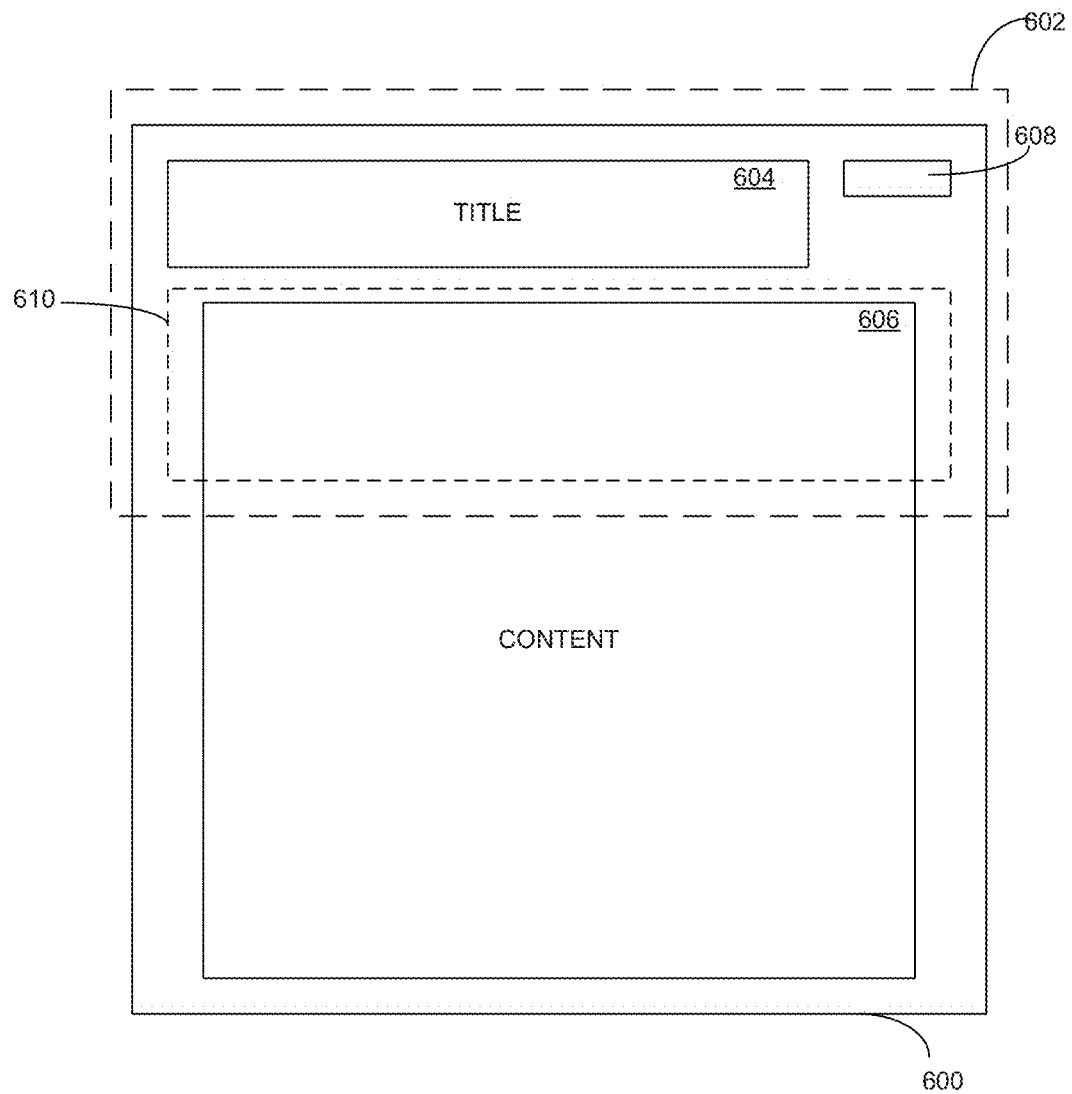
FIG. 6 is an abstract illustration of a social network content item as displayed in a content display area, in an example embodiment.

FIG. 6 is an abstract illustration of a social network content item 600 as displayed in a content display area 206, such as in a page 302. Multiple social network content items 600 may be displayed in the content display area 206 or a social network content item 600 may be displayed within the content display area at a time. The social network content item 600 is generally illustrated in an expanded state, but is demarcated by dashed lines that indicate the limits of a contracted state 602.

The social network content item 600 includes a title space 604, a content space 606, and a state button 608. The title space 604 may include a title and/or other identifying indicator for the social network content item 600, such as an author or posting entity, a date and/or time at which the content item 600 was posted, and other information that may be useful to a user. The content space 606 includes content such as text, images, videos, links, and the like that may be found in social media content generally or that may come to be displayed in social media content in the future. The content space 606 may be sufficiently large to display the text, images, etc., and may be variable based on the total content to be displayed.

The state button 608 may be a soft button, a link, a hot spot, or other mechanism by which a user input may be received by the system 100. The state button 608 may expand and contract the content item 600. The base state for the content item 600 may be in a contracted state, in which the content space 606 occupies no more space than the contracted content space 610 and the social network content item 600 as a whole occupies no more space than the contracted social media content space 602.

The content space 606 may thus display only a subportion of the total content that may be displayed in the content space 606. For instance, if the content includes three paragraphs, the contracted content space 610 may be large enough for only one paragraph or less. In various examples, the contracted content space 610 is the same for all content items 600 that may be displayed, e.g., on a single page 302. In such an example, the content of each social network content item 600 may be truncated indiscriminately to only display an amount of content sufficient to fill the contracted content space 610 and no more. In various alternative examples, the content may be truncated according to various criteria, for instance to display a complete sentence or paragraph or other conventional grammatical demarcation, or to display a designated summary or other contracted content as may be provided, for instance, by an entity which generated the social network content item 600. In such an example, the size of the contracted content space 610 may vary between and among social network content items 600 in a single content display area 206.

Upon selection of the state button 608, the content item 600 may be expanded to the full size of the content item 600 as displayed. The expansion of the content item 600 may be animated from the contracted to expanded states or may simply jump from contracted to expanded. Selection of the state button 608 when the content item 600 is in the expanded state may transition the content item 600 to the contracted state.

FIGS. 7A-7D illustrate a method for inline expansion and contraction of a social network content item. The various individual steps of expansion and contraction may be applicable outside of this particular example and may be performed in any of a variety of orders. Additional steps that are not illustrated here may further be incorporated as appropriate.

Figure 7A:
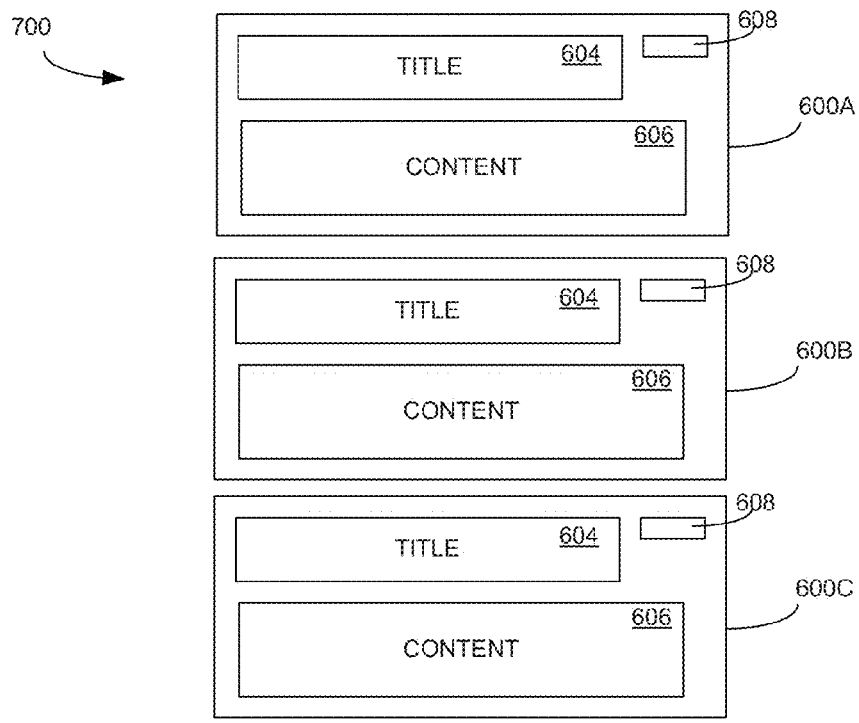
FIGS. 7A-7D illustrate a method for inline expansion and contraction of a social network content item, in an example embodiment.

In FIG. 7A a content display area 700 is illustrated that displays on a user input social network content items 600A, 600B, 600C, each in a contracted state.

Figure 7B:
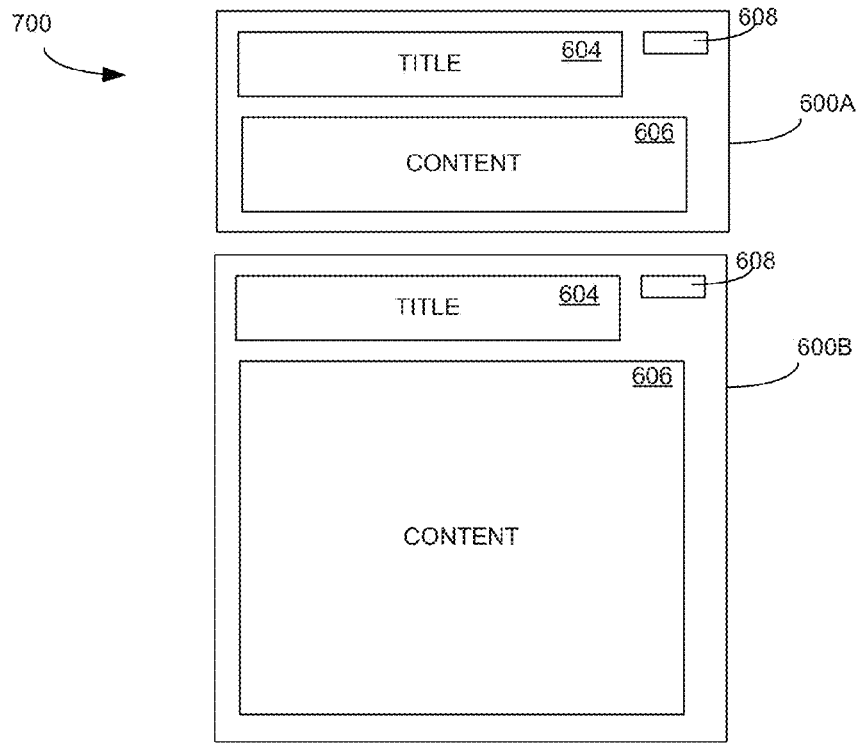

In FIG. 7B, upon a user selecting the state button 608B, the social network content item 600B expands, moving the social network content item 600C out of the content display area 700.

Figure 7C:
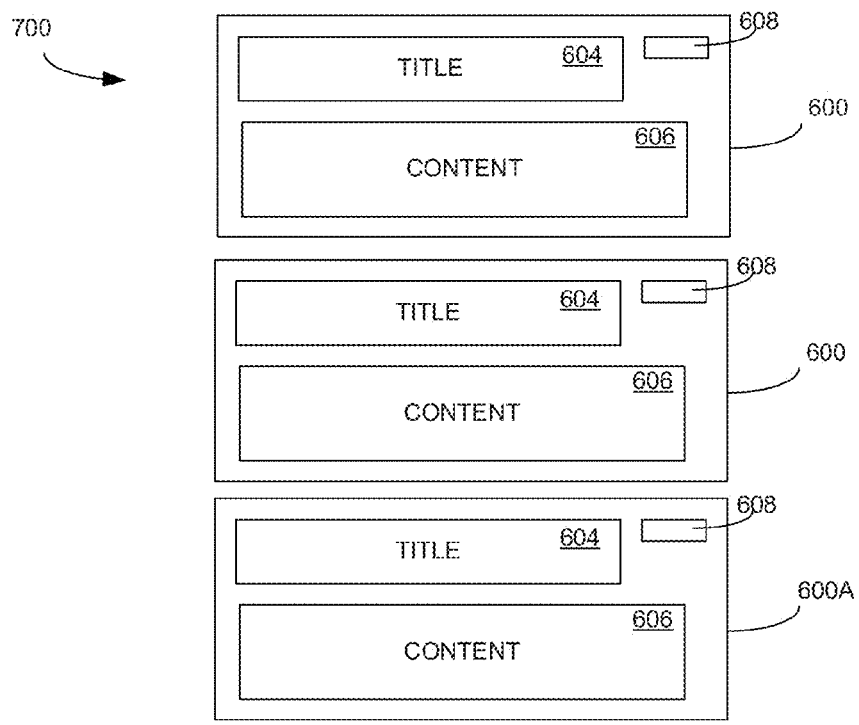

In FIG. 7C, the user scrolls the content display area 700 up so that the social network content item 600B is no longer displayed on the user interface. After the social network content item 600B scrolls off the content display area 700, the social network content item 600B automatically reverts to the contracted state, so that if and when the content display area 700 is scrolled so that the social network content item 600B is back to being displayed the social network content item 600B is in the contracted state.

It is to be understood that the placing of the social network content item 600B in the contracted state may not occur unless the social network content item 600B is actually displayed on the content display area 700 again. Thus, the system 100 may not process the contraction of the social network content item 600B until the social network content item 600B is to be displayed again. In various examples, however, the contraction of the social network content item 600B is illustrated graphically in the content display area 700. In one such example, as the social network content item 600B is scrolling off the screen the contraction of the social network content item 600B is illustrated, for instance with an animation of the social network content item 600B contracting from the expanded state to the contracted state.

Automatic contraction of the social network content item 600B may be generally understood to be based on no longer displaying the social network content item 600B from the content display area 700, such as by scrolling the content item 600B off of the content display area 700. Partial removal of the social network content item 600B from the content display area 700 may qualify to automatically contract the content item 600B. For instance, if the content item 600B as expanded is scrolled off of the content display area 700 so that only the contracted content space 610 is displayed then the content item 600B may be contracted. The content item 600B may be partially contracted, such as a circumstance where part of the content space 606 is scrolled off of the content display area 700, in which case the content item 600B may be contracted only as much as has scrolled off of the content display area 700. Various alternative contracting mechanisms are contemplated.

Figure 7D:
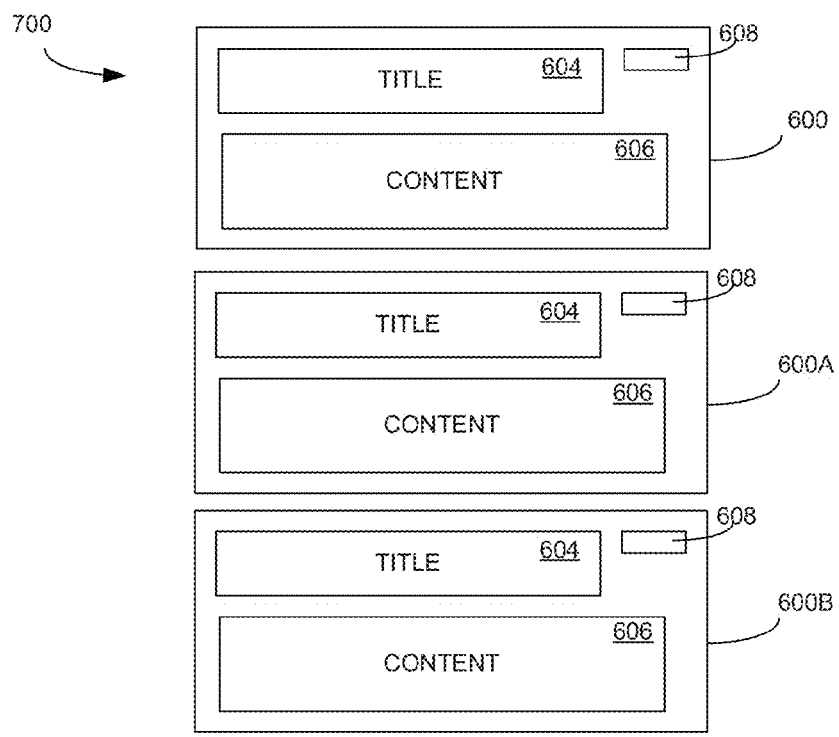

In FIG. 7D, the user scrolls the content display area 700 up so that the social network content item 600B is again displayed. As noted above, because the social network content item 600B was expanded and then scrolled of the content display area 700, the social network content item 600B as displayed is in the contracted state. A user may return the social network content item 600B to the expanded state by selecting the state button 608B as described above.

Icon Background

Figure 8:
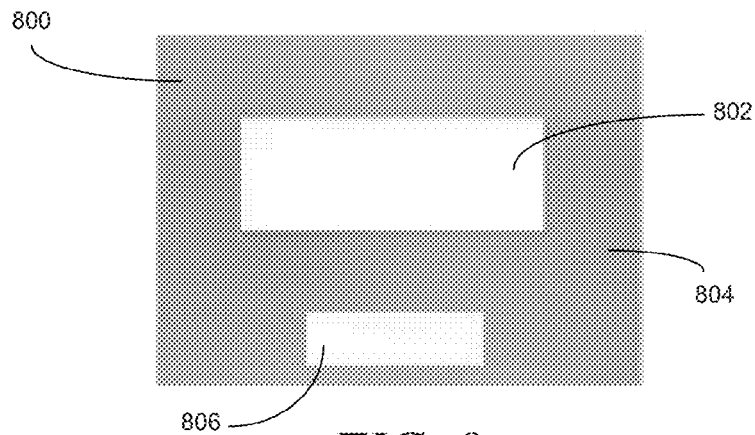
FIG. 8 is an illustration of an icon, in an example embodiment.

FIG. 8 is an illustration of an icon 800. The icon 800 may be generated by the system 100 and displayed on the user interface 200. The icon 800 includes a base graphic 802, such as a logo or picture representative of content associated with the icon 800. The icon 800 further includes a background 804 that may be generated based on the graphic 802. The icon 800 optionally includes a label 806 that may describe, at least in part, the icon 800 and/or the related content. The background 804 of the icon 800 may be generated based on the graphic 802.

Figure 9A:
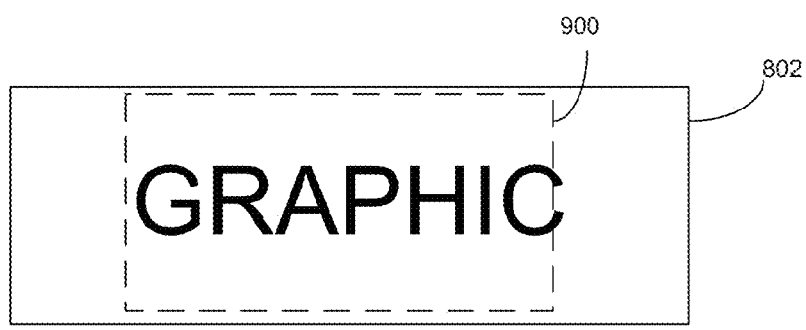
FIGS. 9A-9C illustrate a process by which a background of an icon is generated, in an example embodiment.
Figure 9B:
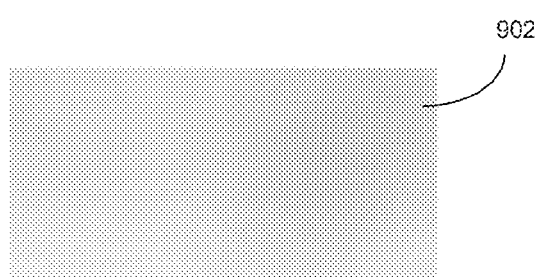
Figure 9C:
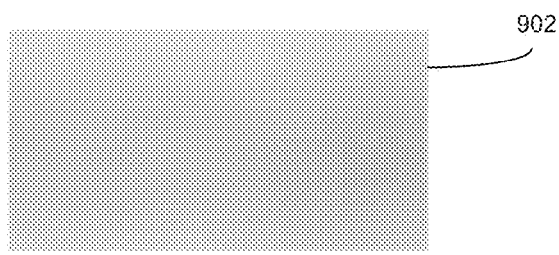

FIGS. 9A-9C illustrate a process by which the background 806 of the icon 800 is generated.

In FIG. 9A, the background 806 has an area 900. The graphic 802 is increased uniformly to occupy an area at least approximately as large as the area 900 of the background 806 in all dimensions.

In FIG. 9B, the graphic 802 is blurred to create a blurred graphic 902. The graphic 802 may be blurred to any of a variety of degrees and according to a variety of methods. In an example, the graphic 802 is blurred to a 25 px radius, though various degrees of blurriness are contemplated.

In FIG. 9C, the color is overlaid on the blurred graphic 902. In various examples, the color is overlaid to a predetermined opacity. In an example, the opacity is approximately forty (40) percent. In various alternative examples, the opacity may be increased or decreased depending on a desired dominance of the color as overlaid.

The color overlaid may be selected according to a variety of criteria. In an example, the color overlaid is selected based on color-sampling of the graphic 802 and/or the blurred graphic 902. In an example, the color as overlaid may be a dominant color of the graphic 802 and/or the blurred graphic 902. The dominant color may be determined by, for instance, an analysis of some or all of the pixels of the graphic 802 and/or blurred graphic 902. In such an example, a color represented by the most pixels may be selected as the overlay color. In various alternative examples, an overlay color may be selected on the basis of any of a variety of color sampling techniques known in the art or that may be developed.

In various alternative overlay color selections, the color may be selected based on a user selection. For instance, a user may view the graphic 802 and/or the blurred graphic 902 and select a color that the user prefers to pair with the graphic 802, such as based on a primary color of the graphic 802, a complimentary color to the graphic 802, and the like. Alternatively, a user may select an overlay color without respect to the graphic 802.

In various examples, the overlay color may be selected to be unique to an entity corresponding to the graphic 802 and/or the icon 800 generally. For instance, a company that has multiple icons 800 may select or be associated with a common overlay color. In such an example, each background 804 may be generated by blurring the graphic 802 with which it is associated and then have the overlay color corresponding to the associated entity applied to create the final background 804.

Flowcharts

Figure 10:
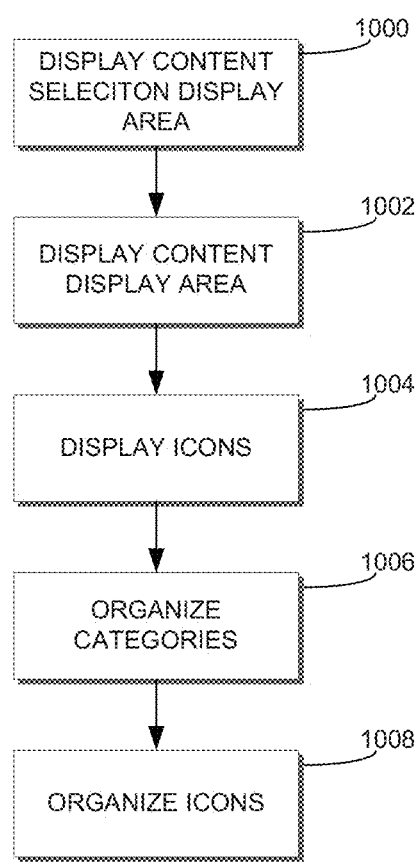
FIG. 10 is a flowchart for displaying a social network user interface, in an example embodiment.

FIG. 10 is a flowchart for displaying a social network user interface. The flowchart may be performed with any of a variety of devices and systems disclosed herein, as well as with any suitable system known in the art.

At operation 1000, a content selection display area is displayed, with a processor via a network interface device, on a user interface. The content selection display area includes a plurality of subject matter categories and a plurality of icons, at least some of the plurality of icons being individually associated with at least one of the subject matter categories and at least some of the categories being associated with at least one of the plurality of icons. Each category is associated with at most a predetermined number of the plurality of icons.

In an example, the content selection display area is a ribbon, wherein the ribbon is scrollable to display all of the plurality of icons. In an example, the categories correspond to positions within the content selection display area, wherein a position of a first one of the plurality of categories is fixed and wherein a position of a second one of the plurality of categories is variable. In an example, the variable position is based, at least in part, on a user selection and a likelihood of a user accessing an icon associated with the second one of the plurality of categories. In an example, the first one of the plurality of icons is fixed in an earliest one of the positions.

At operation 1002, a content display area is displayed with the processor on the user interface, the content display area configured to display content corresponding to at least one of the plurality of icons as selected in the content selection display area.

At operation 1004, additional icons related to one of the plurality of categories is displayed based on a user selection. In an example, the displaying the additional icons is in the content display area.

At operation 1006, multiple ones of the plurality of categories are organized in variable positions according to user selection and according to a likelihood of accessing the icon. In an example, the user selection has a higher priority than the likelihood.

Figure 11:
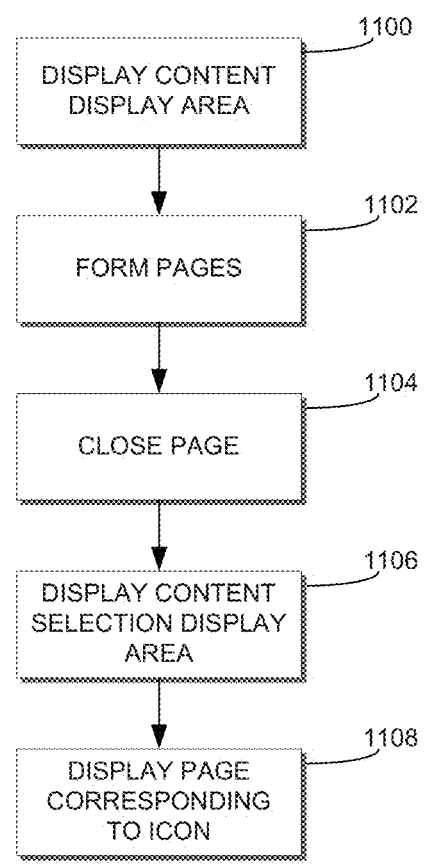
FIG. 11 is a flowchart for displaying a social network content display area having multiple pages, in an example embodiment.

At operation 1008, the plurality of icons are organized into the plurality of categories based, at least in part, on common subject matter associated with the plurality of icons FIG. 11 is a flowchart for displaying a social network content display area having multiple pages. The flowchart may be performed with any of a variety of devices and systems disclosed herein, as well as with any suitable system known in the art.

At operation 1100, a content display area is displayed, using a processor via a network interface device, on a user interface, the content display area configured to display a plurality of pages, wherein at least one of the plurality of pages is displayed based on a user selection and at least one of the pages being displayed without respect to a user selection.

At operation 1102, the plurality of pages are formed, with the processor, into a stack with respect to one another, a newly selected one of the plurality of pages being displayed on a top of the stack and an oldest-selected one of the plurality of pages being displayed on a bottom of the stack, ones of the plurality of pages not on the top of the stack being displayed only in part. In an example, displaying the plurality of pages makes each one of the plurality of pages visible in the content display area. In an example, each one of the plurality of pages includes social media content, wherein only social media content relating to the top one of the plurality of pages is visible.

At operation 1104, one of the plurality of pages is closed by removing the at least one of the plurality of pages from the stack. In an example, if the at least one of the plurality of pages is displayed on the top of the stack, an immediately lower one of the plurality of pages on the stack is subsequently displayed on the top of the stack. In an example, the plurality of pages are selectable, and closing one of the plurality of pages comprises selecting one of the plurality of pages not on the top of the stack to close ones of the plurality of pages above the one of the plurality of pages as selected. In an example, one of the plurality of pages is a permanent page that is not closeable, and closing of non-permanent pages in the stack is based on selection of the permanent page.

At operation 1106, a content selection display area is displayed, with the processor, on the user interface, the content selection display area being configured to display a plurality of icons. In an example, displaying one of the plurality of pages is based on selection of a corresponding one of the plurality of icons. In an example, at least some of the plurality of pages corresponds to ones of the plurality of icons.

At operation 1108, displaying, based on a selection of one of the plurality of icons, one of the plurality of pages that is currently displayed causes the one of the plurality of pages to be displayed at the top of the stack. In an example, displaying the one of the plurality of pages at the top of the stack includes closing ones of the plurality of pages above the one of the plurality of pages on the stack. In an example, displaying the one of the plurality of pages at the top of the stack includes creating, on the top of the stack, a second instance of the one of the plurality of pages. In an example, displaying the one of the plurality of pages at the top of the stack includes moving the one of the plurality of pages to the top of the stack.

Figure 12:
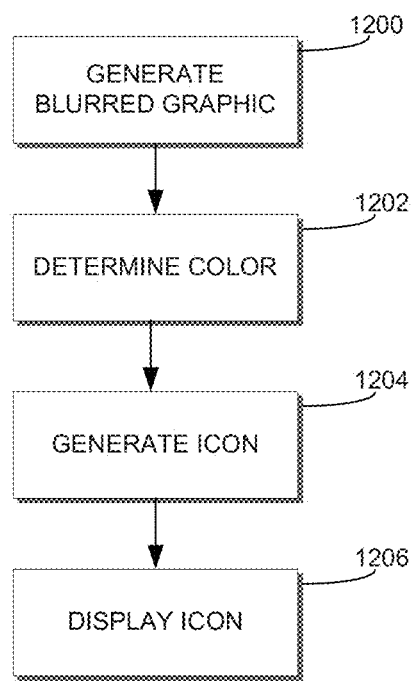
FIG. 12 is a flowchart for generating and displaying an icon, in an example embodiment.

FIG. 12 is a flowchart for generating and displaying an icon. The flowchart may be performed with any of a variety of devices and systems disclosed herein, as well as with any suitable system known in the art.

At operation 1200, a blurred form of a graphic is generated based on the graphic. In an example, the blurred form of the graphic includes blurring the graphic to a 25 px radius. In an example, generating the background is based on the graphic being increased in size. In an example, the processor is configured to increase the size of the graphic so that the graphic as increased in size is at least as large as the background in length and width.

At operation 1202, a most commonly-occurring color of the graphic is determined based on a comparison of at least some of the pixels of the graphic.

At operation 1204, an icon is generated with a processor, the icon including a graphic and a background based, at least in part, on a blurred form of the graphic and an overlay color. In an example, the overlay color is based on a most commonly-occurring color in the graphic. In an example, the overlay color is based on a user selection. In an example, the icon is one of a plurality of icons, at least one other one of the plurality of icons being related to the icon, and the icon and the one other one of the plurality of icons have a common overlay color. In an example, the overlay color has an opacity. In an example, the opacity is approximately forty (40) percent.

At operation 1206, the icon as generated is displayed, on a user interface via a network interface device.

Figure 13:
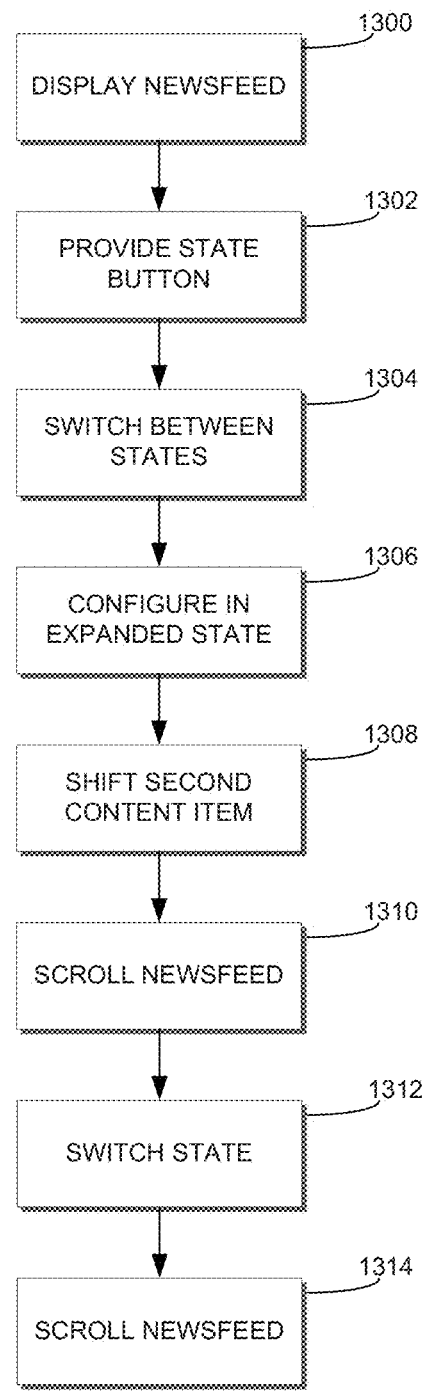
FIG. 13 is a flowchart for inline expansion and contraction of social network content items in a newsfeed, in an example embodiment.

FIG. 13 is a flowchart for inline expansion and contraction of social network content items in a newsfeed. The flowchart may be performed with any of a variety of devices and systems disclosed herein, as well as with any suitable system known in the art.

At operation 1300, a user interface is caused, with a processor coupled to a network interface device, to display a newsfeed including social network content items, the newsfeed being configured to scroll to display ones of the social network content items on the user interface, and at least one of the social network content items includes a title and content.

At operation 1302, a state button is provided, by the processor, on the user interface corresponding to the social network content items and configured to switch the at least one social network content item between the expanded state and contracted state upon a user selection of the state button.

At operation 1304, a social network content item is switched between the expanded state and the contracted state with an animation transitioning between the expanded state and the contracted state.

At operation 1306, at least one of the social network content items is configured in an expanded state corresponding to displaying all of the content of the social network content item upon a user selection. In an example, the at least one social network content item occupies a first linear space in the newsfeed in the expanded state and a second linear space in the newsfeed in the contracted state, the first linear space being greater than the second linear space. In an example, multiple ones of the social network content items are separately configurable in the expanded and contracted states, and each social network content item in the contracted state occupies the second linear space. In an example, the multiple ones of the social network content items have different first linear spaces in the expanded state.

At operation 1308, upon switching a first one of the social network content items from the contracted state to the expanded state, shifting a second one of the social network content items lower on the newsfeed than the first one of the social network content items shifts lower in the newsfeed to create space to display the content of the first social network content item At operation 1310, the newsfeed is scrolled so that the at least one social network content item is not displayed on the user interface.

At operation 1312, when the at least one social network content item is in the expanded state, switching, with the processor, the social network content item from the expanded state to the contracted state when the at least one social network content item is scrolled off of the user interface. In an example, switching the social network content item includes switching the at least one social network content item to the contracted state as the social network content item is scrolled off of the user interface. In an example, switching the social network content item includes switching the at least one social network content item to the contracted state with an animation transitioning from the expanded state to the contracted state.

At operation 1314, the newsfeed is scrolled so that the at least one social network content item is displayed on the user interface, the at least one social network content item being displayed in a contracted state corresponding to displaying a sub-portion of the content.

System

Figure 14:
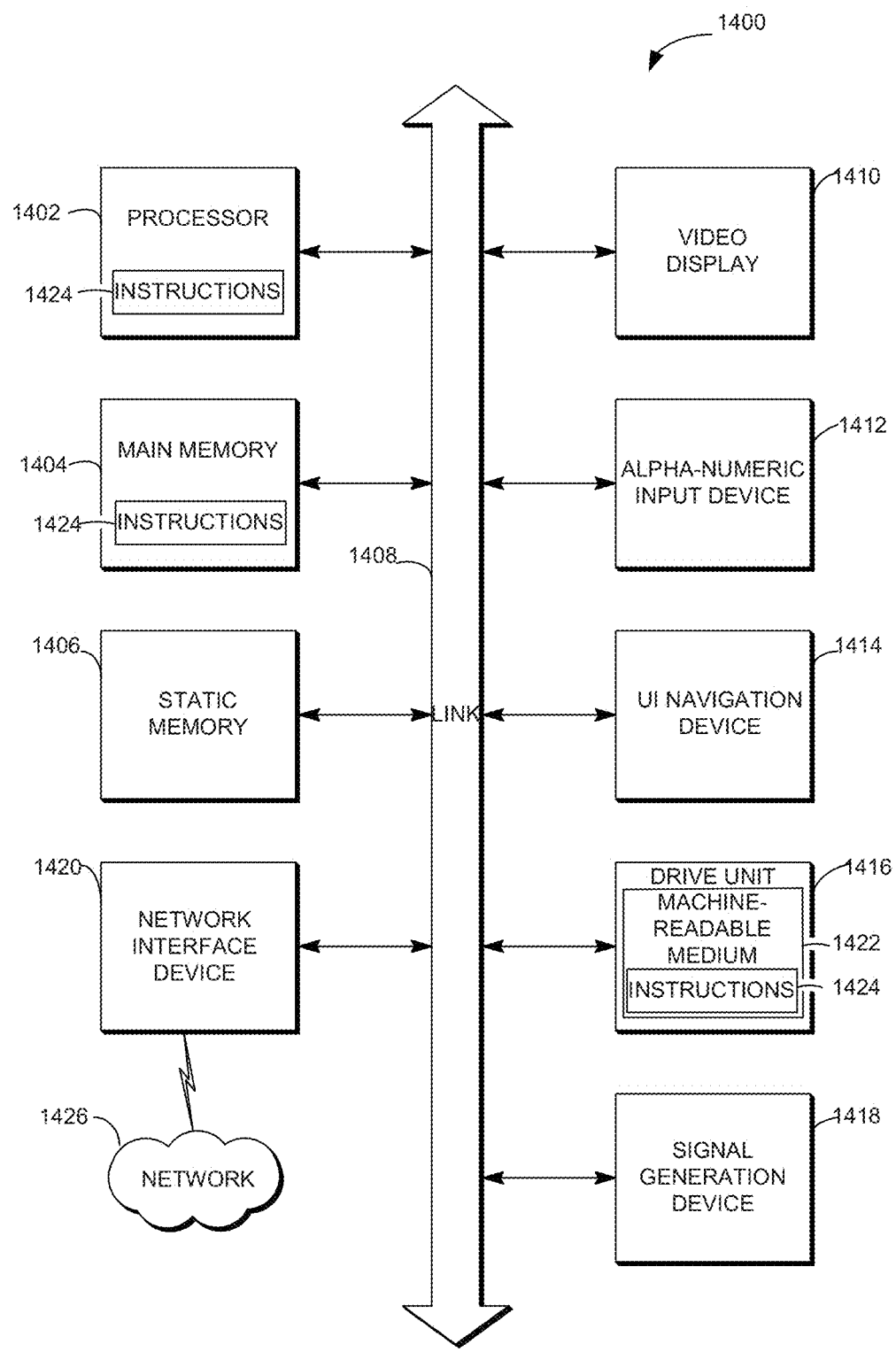
FIG. 14 is a block diagram illustrating components of a machine able to read instructions from a machine-readable medium.

FIG. 14 is a block diagram illustrating components of a machine 1400, according to some example embodiments, able to read instructions from a machine-readable medium (e.g., a machine-readable storage medium) and perform any one or more of the methodologies discussed herein. Specifically, FIG. 14 shows a diagrammatic representation of the machine 1400 in the example form of a computer system and within which instructions 1424 (e.g., software) for causing the machine 1400 to perform any one or more of the methodologies discussed herein may be executed. In alternative embodiments, the machine 1400 operates as a standalone device or may be connected (e.g., networked) to other machines. In a networked deployment, the machine 1400 may operate in the capacity of a server machine or a client machine in a server-client network environment, or as a peer machine in a peer-to-peer (or distributed) network environment. The machine 1400 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1424, sequentially or otherwise, that specify actions to be taken by that machine. Further, while only a single machine is illustrated, the term "machine" shall also be taken to include a collection of machines that individually or jointly execute the instructions 1424 to perform any one or more of the methodologies discussed herein.

The machine 1400 includes a processor 1402 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1404, and a static memory 1406, which are configured to communicate with each other via a bus 1408. The machine 1400 may further include a graphics display 1410 (e.g., a plasma display panel (PDP), a light emitting diode (LED) display, a liquid crystal display (LCD), a projector, or a cathode ray tube (CRT)). The machine 1400 may also include an alphanumeric input device 1412 (e.g., a keyboard), a cursor control device 1414 (e.g., a mouse, a touchpad, a trackball, a joystick, a motion sensor, or other pointing instrument), a storage unit 1416, a signal generation device 1418 (e.g., a speaker), and a network interface device 1420.

The storage unit 1416 includes a machine-readable medium 1422 on which is stored the instructions 1424 (e.g., software) embodying any one or more of the methodologies or functions described herein. The instructions 1424 may also reside, completely or at least partially, within the main memory 1404, within the processor 1402 (e.g., within the processor's cache memory), or both, during execution thereof by the machine 1400. Accordingly, the main memory 1404 and the processor 1402 may be considered as machine-readable media. The instructions 1424 may be transmitted or received over a network 1426 via the network interface device 1420.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1422 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., software) for execution by a machine (e.g., machine 1400), such that the instructions, when executed by one or more processors of the machine (e.g., processor 1402), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

EXAMPLES

In Example 1, a system includes a network interface device communicatively coupled to a user interface and a processor, coupled to the network interface device, configured to cause the user interface to display a newsfeed including social network content items, the newsfeed being configured to scroll to display ones of the social network content items on the user interface. At least one of the social network content items includes a title and content. The at least one social network content item is configurable in an expanded state corresponding to displaying all of the content of the social network content item upon a user selection and a contracted state corresponding to displaying a sub-portion of the content. The newsfeed is configured to display the social network content items in the contracted state upon the social network content item scrolling onto the user interface without respect to the social network content item being in an expanded state when previously displayed.

In Example 2, the system of Example 1 optionally further includes that, when the at least one social network content item is in the expanded state, the processor is configured to switch the social network content item from the expanded state to the contracted state when the at least one social network content item is scrolled off of the user interface.

In Example 3, the system of and one or more of Examples 1 and 2 optionally further includes that the processor is configured to switch the at least one social network content item to the contracted state as the social network content item is scrolled off of the user interface.

In Example 4, the system of and one or more of Examples 1-3 optionally further includes that the processor is configured to switch the at least one social network content item to the contracted state with an animation transitioning from the expanded state to the contracted state.

In Example 5, the system of and one or more of Examples 1-4 optionally further includes that the processor is further configured to provide, on the user interface, a state button corresponding to the social network content items and configured to switch the at least one social network content item between the expanded state and contracted state upon a user selection of the state button.

In Example 6, the system of and one or more of Examples 1-5 optionally further includes that the processor is further configured to switch the at least one social network content item between the expanded state and the contracted state with an animation transitioning between the expanded state and the contracted state.

In Example 7, the system of and one or more of Examples 1-6 optionally further includes that the at least one social network content item occupies a first linear space in the newsfeed in the expanded state and a second linear space in the newsfeed in the contracted state, the first linear space being greater than the second linear space.

In Example 8, the system of and one or more of Examples 1-7 optionally further includes that multiple ones of the social network content items are separately configurable in the expanded and contracted states, and wherein each social network content item in the contracted state occupies the second linear space.

In Example 9, the system of and one or more of Examples 1-8 optionally further includes that the multiple ones of the social network content items have different first linear spaces in the expanded state.

In Example 10, the system of and one or more of Examples 1-9 optionally further includes that upon shifting a first one of the social network content items from the contracted state to the expanded state, a second one of the social network content items lower on the newsfeed than the first one of the social network content items shifts lower in the newsfeed to create space to display the content of the first social network content item.

In Example 11, a method includes causing, with a processor coupled to a network interface device, a user interface to display a newsfeed including social network content items, the newsfeed being configured to scroll to display ones of the social network content items on the user interface, wherein at least one of the social network content items includes a title and content, configuring, with the processor, at least one of the social network content items in an expanded state corresponding to displaying all of the content of the social network content item upon a user selection, responsive to a first scrolling input received form the user interface, displaying the newsfeed so that the at least one social network content item is not displayed on the user interface, and then, responsive to a second scrolling input received from the user interface, displaying the newsfeed so that the at least one social network content item is displayed on the user interface, the at least one social network content item being displayed in a contracted state corresponding to displaying a sub-portion of the content.

In Example 12, the method of Example 11 optionally further includes, when the at least one social network content item is in the expanded state, switching, with the processor, the social network content item from the expanded state to the contracted state when the at least one social network content item is scrolled off of the user interface.

In Example 13, the method of any one or more of Examples 11 and 12 optionally further includes that switching the social network content item includes switching the at least one social network content item to the contracted state as the social network content item is scrolled off of the user interface.

In Example 14, the method of any one or more of Examples 11-13 optionally further includes that switching the social network content item includes switching the at least one social network content item to the contracted state with an animation transitioning from the expanded state to the contracted state.

In Example 15, the method of any one or more of Examples 11-14 optionally further includes providing, with the processor, a state button on the user interface corresponding to the social network content items and configured to switch the at least one social network content item between the expanded state and contracted state upon a user selection of the state button.

In Example 16, the method of any one or more of Examples 11-15 optionally further includes switching, with the processor, the at least one social network content item between the expanded state and the contracted state with an animation transitioning between the expanded state and the contracted state.

In Example 17, the method of any one or more of Examples 11-16 optionally further includes that the at least one social network content item occupies a first linear space in the newsfeed in the expanded state and a second linear space in the newsfeed in the contracted state, the first linear space being greater than the second linear space.

In Example 18, the method of any one or more of Examples 11-17 optionally further includes that multiple ones of the social network content items are separately configurable in the expanded and contracted states, and wherein each social network content item in the contracted state occupies the second linear space.

In Example 19, the method of any one or more of Examples 11-18 optionally further includes that the multiple ones of the social network content items have different first linear spaces in the expanded state.

In Example 20, the method of any one or more of Examples 11-19 optionally further includes, upon switching a first one of the social network content items from the contracted state to the expanded state, shifting a second one of the social network content items lower on the newsfeed than the first one of the social network content items shifts lower in the newsfeed to create space to display the content of the first social network content item.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A system, comprising:
   a computer readable medium comprising instructions which, when implemented on a processor, cause the processor to perform operations, comprising:
   cause a user interface to display a newsfeed including social network content items, the newsfeed being configured to scroll to display ones of the social network content items on the user interface;
   wherein at least one of the social network content items includes a title and content;
   wherein the at least one social network content item is configurable in:
   an expanded state corresponding to displaying essentially all of the content of the social network content item upon a user selection;

a contracted state corresponding to displaying a sub-portion of the content;
wherein the newsfeed is configured to display the social network content items in the contracted state upon the social network content item scrolling onto the user interface without respect to the social network content item being in an expanded state when previously displayed;
wherein the at least one social network content item has a first linear length in the newsfeed in the expanded state and a second linear length in the newsfeed in the contracted state, the first linear length being greater than the second linear length;
wherein multiple ones of the social network content items are separately configurable in the expanded and contracted states, and wherein at least two of the social network content items in the contracted state have the second linear length by truncating the content of the social network content item according to a conventional grammatical demarcation other than a sentence demarcation; and
wherein at least some of the social network content items have different first linear lengths in the expanded state.

2. The system of claim 1, wherein, when the at least one social network content item is in the expanded state, the instructions further cause the processor to switch the social network content item from the expanded state to the contracted state when the at least one social network content item is scrolled off of the user interface.

3. The system of claim 2, wherein instructions further cause the processor to switch the at least one social network content item to the contracted state as the social network content item is scrolled off of the user interface.

4. The system of claim 3, wherein instructions further cause the processor to switch the at least one social network content item to the contracted state with an animation transitioning from the expanded state to the contracted state.

5. The system of claim 1, wherein instructions further cause the processor to provide, on the user interface, a state button corresponding to the social network content items and configured to switch the at least one social network content item between the expanded state and contracted state upon a user selection of the state button.

6. The system of claim 5, wherein instructions further cause the processor to switch the at least one social network content item between the expanded state and the contracted state with an animation transitioning between the expanded state and the contracted state.

7. The system of claim 1, wherein, upon shifting a first one of the social network content items from the contracted state to the expanded state, a second one of the social network content items lower on the newsfeed than the first one of the social network content items shifts lower in the newsfeed to create space to display the content of the first social network content item.

8. A method, comprising:
causing, with a processor coupled to a network interface device, a user interface to display a newsfeed including social network content items, the newsfeed being configured to scroll to display ones of the social network content items on the user interface, wherein at least one of the social network content items includes a title and content;
configuring, with the processor, at least one of the social network content items in an expanded state corresponding to displaying essentially all of the content of the social network content item upon a user selection;
responsive to a first scrolling input received form the user interface, displaying the newsfeed so that the at least one social network content item is not displayed on the user interface; then
responsive to a second scrolling input received from the user interface, displaying the newsfeed so that the at least one social network content item is displayed on the user interface, the at least one social network content item being displayed in a contracted state corresponding to displaying a sub-portion of the content; and
when the at least one social network content item is in the expanded state, switching, with the processor, the social network content item from the expanded state to the contracted state when the at least one social network content item is scrolled off of the user interface;
wherein switching the social network content item includes switching the at least one social network content item to the contracted state as the social network content item is scrolled off of the user interface by truncating the content of the social network content item according to a conventional grammatical demarcation other than a sentence demarcation to occupy a predetermined linear length of the newsfeed; and
wherein switching the social network content item includes switching the at least one social network content item to the contracted state with an animation transitioning from the expanded state to the contracted state.

9. The method of claim 8, further comprising providing, with the processor, a state button on the user interface corresponding to the social network content items and configured to switch the at least one social network content item between the expanded state and contracted state upon a user selection of the state button.

10. The method of claim 9, further comprising switching, with the processor, the at least one social network content item between the expanded state and the contracted state with an animation transitioning between the expanded state and the contracted state.

11. The method of claim 8, wherein the linear length is a second linear length, wherein the at least one social network content item occupies a first linear length in the newsfeed in the expanded state and the second linear length in the newsfeed in the contracted state, the first linear length being greater than the second linear length.

12. The method of claim 11, wherein multiple ones of the social network content items are separately configurable in the expanded and contracted states, and wherein at least two social network content item in the contracted state have the second linear length.

13. The method of claim 12, wherein the multiple ones of the social network content items have different first linear lengths in the expanded state.

14. The method of claim 8, further comprising, upon switching a first one of the social network content items from the contracted state to the expanded state, shifting a second one of the social network content items lower on the newsfeed than the first one of the social network content items shifts lower in the newsfeed to create space to display the content of the first social network content item.

15. A computer readable medium comprising instructions which, when implemented on a processor, cause the processor to perform operations, comprising:
cause a user interface to display a newsfeed including social network content items, the newsfeed being configured to scroll to display ones of the social network content items on the user interface, wherein at least one of the social network content items includes a title and content;

configure at least one of the social network content items in an expanded state corresponding to displaying essentially all of the content of the social network content item upon a user selection;

responsive to a first scrolling input received form the user interface, display the newsfeed so that the at least one social network content item is not displayed on the user interface; then responsive to a second scrolling input received from the user interface, display the newsfeed so that the at least one social network content item is displayed on the user interface, the at least one social network content item being displayed in a contracted state corresponding to displaying a sub-portion of the content; and when the at least one social network content item is in the expanded state, switch, with the processor, the social network content item from the expanded state to the contracted state when the at least one social network content item is scrolled off of the user interface;

wherein switching the social network content item includes switching the at least one social network content item to the contracted state as the social network content item is scrolled off of the user interface by truncating the content of the social network content item according to a conventional grammatical demarcation other than a sentence demarcation to occupy a predetermined linear length of the newsfeed; and wherein switching the social network content item includes switching the at least one social network content item to the contracted state with an animation transitioning from the expanded state to the contracted state.

16. The computer readable medium of claim 15, further comprising providing, with the processor, a state button on the user interface corresponding to the social network content items and configured to switch the at least one social network content item between the expanded state and contracted state upon a user selection of the state button.

17. The computer readable medium of claim 16, wherein the instructions further cause the processor to perform operations comprising:
    switching the at least one social network content item between the expanded state and the contracted state with an animation transitioning between the expanded state and the contracted state.

18. The computer readable medium of claim 15, wherein the linear length is a second linear length, wherein the at least one social network content item occupies a first linear length in the newsfeed in the expanded state and the second linear length in the newsfeed in the contracted state, the first linear length being greater than the second linear length.

19. The computer readable medium of claim 18, wherein multiple ones of the social network content items are separately configurable in the expanded and contracted states, and wherein at least two social network content items in the contracted state occupy the second linear length.

20. The computer readable medium of claim 19, wherein the multiple ones of the social network content items have different first linear lengths in the expanded state.

* * * * *